US 7,716,943 B2

(12) United States Patent
Seefeldt

(10) Patent No.: US 7,716,943 B2
(45) Date of Patent: May 18, 2010

(54) HEATING/COOLING SYSTEM

(75) Inventor: William J. Seefeldt, Monticello, MN (US)

(73) Assignee: Electro Industries, Inc., Monticello, MN (US)

( * ) Notice: Subject to any disclaimer, the term of this patent is extended or adjusted under 35 U.S.C. 154(b) by 1123 days.

(21) Appl. No.: 11/126,660

(22) Filed: May 11, 2005

(65) Prior Publication Data

US 2005/0252226 A1 Nov. 17, 2005

Related U.S. Application Data

(60) Provisional application No. 60/570,402, filed on May 12, 2004.

(51) Int. Cl.
F25B 13/00 (2006.01)
F25B 27/00 (2006.01)
F25B 39/04 (2006.01)

(52) U.S. Cl. ............... 62/324.6; 62/324.1; 62/506

(58) Field of Classification Search ............ 62/160, 62/228.1, 228.4, 228.5, 238.6, 238.7, 324.1, 62/324.6, 506
See application file for complete search history.

(56) References Cited

U.S. PATENT DOCUMENTS

| | | | | |
|---|---|---|---|---|
| 4,167,965 A | | 9/1979 | Rogers | |
| 4,257,239 A | * | 3/1981 | Partin et al. | 62/238.7 |
| 4,299,098 A | * | 11/1981 | Derosier | 62/238.6 |
| 4,338,791 A | * | 7/1982 | Stamp et al. | 62/160 |
| 4,420,947 A | * | 12/1983 | Yoshino | 62/160 |
| 4,567,733 A | | 2/1986 | Mecozzi | |
| 4,592,206 A | * | 6/1986 | Yamazaki et al. | 62/160 |
| 4,594,858 A | | 6/1986 | Shaw | |
| 4,727,727 A | * | 3/1988 | Reedy | 62/238.6 |
| 5,095,712 A | | 3/1992 | Narreau | |
| 5,263,333 A | * | 11/1993 | Kubo et al. | 62/160 |
| 5,582,022 A | | 12/1996 | Heinrichs et al. | |
| 5,680,898 A | * | 10/1997 | Rafalovich et al. | 165/236 |
| 5,755,104 A | | 5/1998 | Rafalovich | |
| 5,845,502 A | | 12/1998 | Chen | |
| 5,927,088 A | | 7/1999 | Shaw | |
| 5,983,660 A | | 11/1999 | Kiessel | |
| 6,202,427 B1 | * | 3/2001 | Weng | 62/159 |
| 6,233,951 B1 | | 5/2001 | Cardill | |
| 6,276,148 B1 | | 8/2001 | Shaw | |
| 6,370,896 B1 | | 4/2002 | Sakitibara et al. | |
| 6,385,980 B1 | | 5/2002 | Sienel | |

(Continued)

OTHER PUBLICATIONS

Bertsch et al. "Review of Air-Source Heat Pumps for Low Temperature Climates," Pudue University, undated.

(Continued)

*Primary Examiner*—Chen-Wen Jiang
(74) *Attorney, Agent, or Firm*—Dowell Baker, P.C.

(57) ABSTRACT

A heat pump system including a first heating/cooling exchange loop including a refrigerant to water heat exchanger to produce a first output. A second heating/cooling exchange loop includes a refrigerant to forced air heat exchanger to produce a second output. A compressor is fluidly coupled to the first heating/cooling exchange loop and the second heating/cooling exchange loop. A controller is connected to control the first output and the second output and to transmit control signals to the at least one compressor, for balancing the first output and the second output responsive to a structural heating/cooling load.

41 Claims, 12 Drawing Sheets

U.S. PATENT DOCUMENTS

| | | |
|---|---|---|
| 6,385,981 B1 | 5/2002 | Vaisman |
| 6,430,949 B2 | 8/2002 | Noro et al. |
| 6,467,288 B2 | 10/2002 | Kuroki et al. |
| 6,467,289 B2 | 10/2002 | Kuroki et al. |
| 6,481,234 B2 * | 11/2002 | Ma et al. .................... 62/324.1 |
| 6,494,051 B2 | 12/2002 | Sakakibara et al. |
| 6,505,476 B1 | 1/2003 | Nishida et al. |
| 6,508,073 B2 | 1/2003 | Noro et al. |
| 6,568,199 B1 | 5/2003 | Manohar et al. |
| 6,574,977 B2 | 6/2003 | Ozaki et al. |
| 6,615,602 B2 | 9/2003 | Wilkinson |
| 6,666,040 B1 * | 12/2003 | Groenewold et al. .......... 62/173 |
| 6,698,234 B2 | 3/2004 | Gopalnarayanan et al. |
| 2003/0061827 A1 | 4/2003 | Sakakibara |
| 2004/0177631 A1 | 9/2004 | Lifson |
| 2004/0206110 A1 | 10/2004 | Lifson |
| 2005/0044866 A1 | 3/2005 | Shaw |
| 2006/0266063 A1 | 11/2006 | Groll et al. |
| 2006/0266074 A1 | 11/2006 | Groll et al. |

OTHER PUBLICATIONS

Appendix, References and Summary of Papers, Mar. 2004.

* cited by examiner

HEATING/COOLING SYSTEM

CROSS-REFERENCE TO RELATED APPLICATION

This application claims priority under 35 U.S.C. §119(e) to U.S. Provisional Patent Application No. 60/570,402, filed May 12, 2004, which is incorporated herein by reference.

BACKGROUND

This invention relates to heat pump heating/cooling systems. More particularly, this invention relates to heat pump heating/cooling systems especially suited for use in northern climates.

Heating and air conditioning in northern climates can present a challenge. Northern climates are characterized by cold, dry air in the winter months, and warm, humid air in the summer months. The outdoor temperature in the winter months can be extremely cold. For this reason, the energy required to heat a house in winter is generally much greater than the energy required to cool the same northern climate house in the summer.

Known heat pumps are generally air source heat pumps, water (ground) source heat pumps, water-to-air heat pumps, or water-to-water heat pumps. Generally air source heat pumps employed in northern climates do not meet the desired heating requirements.

During the winter months in the northern climates, known air source heat pumps convert relatively cold outdoor air to heated air for use inside a structure, for example homes and offices. As an example, when the outdoor ambient air temperature is approximately 20 degrees below zero Fahrenheit, approximately 60,000 BTU/hr of heating capacity is required to heat a typical home. Known air source heat pumps capable of producing 60,000 BTU/hr of heating during the winter months will inherently provide about four times the energy capacity required for cooling during the summer months. That is to say, the capacity to heat in the winter greatly exceeds the cooling capacity required during the summer, such that an imbalanced and inefficient cooling capacity ratio is provided by known heat pumps.

In addition, known air source heat pumps common in the northern climates experience a drastic drop-off in heating efficiency in the winter months. Specifically, the cold winter air is dense, and pulling heat energy from the dense air is challenging. That is to say, auxiliary energy (i.e., additional energy) is required to proportionally heat the colder outdoor air common in the northern climates for heating use inside structures. The auxiliary energy is supplied at an efficiency of 100% or less, such that the use of auxiliary heating results in a drop-off in the system heating efficiency in the winter months.

Moreover, in many instances coils employed with known cooling units will not function properly for most northern climate heat pump installations. This is because the coils experience increased frost build up that forms icing on the coils, thus reducing air flow heat exchange across the coils.

For these reasons, known heat pumps commonly employed in heating and cooling northern climate structures have at least two disadvantages. The first disadvantage is that traditional heat pumps provide much greater cooling capacity than is required in the summer months because the heating capacity needed to meet the heating needs of the winter months is so much larger than that needed for cooling. Secondly, the heating efficiency derived from known heat pumps drastically drops off for cold outdoor ambient air temperatures. Therefore, a need exists for a heating/cooling system capable of efficiently and quickly heating an indoor northern climate structure and cooling via air conditioning the same structure in the summer months.

SUMMARY

One aspect of the present invention provides a heat pump system including a first heating/cooling exchange loop including a refrigerant to water heat exchanger to produce a first output. A second heating/cooling exchange loop includes a refrigerant to forced air heat exchanger to produce a second output. At least one compressor is fluidly coupled to the first heating/cooling exchange loop and the second heating/cooling exchange loop. A controller is connected to control the first output and the second output and to transmit control signals to the at least one compressor, for balancing the first output and the second output responsive to a structural heating/cooling load.

Another aspect of the present invention provides a method of heating/cooling a structure. The method includes providing a first refrigerant to water heat exchange loop coupled to a second refrigerant to air heat exchange loop. The method additionally provides fluidly coupling a multi-speed compressor to the first and second heat exchange loops. The method further provides operating the multi-speed compressor to balance heating/cooling from the first heat exchange loop relative to the second heat exchange loop.

DETAILED DESCRIPTION

Figure 1:
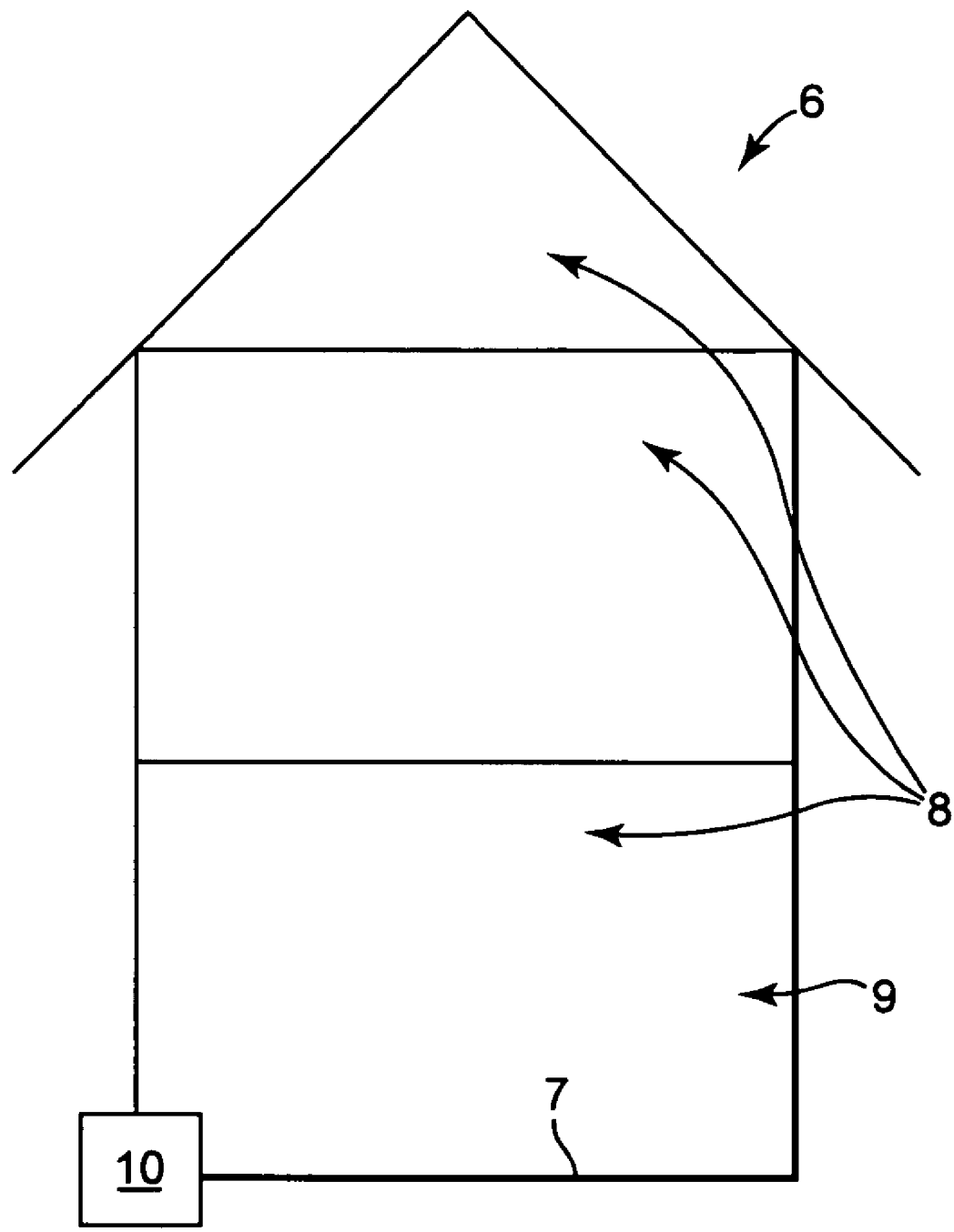
FIG. 1 illustrates a structure including a heating/cooling system according to one embodiment of the present invention.

FIG. 1 illustrates a thermodynamically controlled structure 6 according to one embodiment of the patent invention. Structure 6 includes a floor 7, air spaces 8 including air spaces in a lower room area 9, and a heating/cooling system 10. In one embodiment described below, heating/cooling system 10 includes hydronic heating means installed into floor 7 in, for example, lower room area 9, and air system heating/cooling means employed to thermodynamically condition air spaces 8.

Figure 2A:
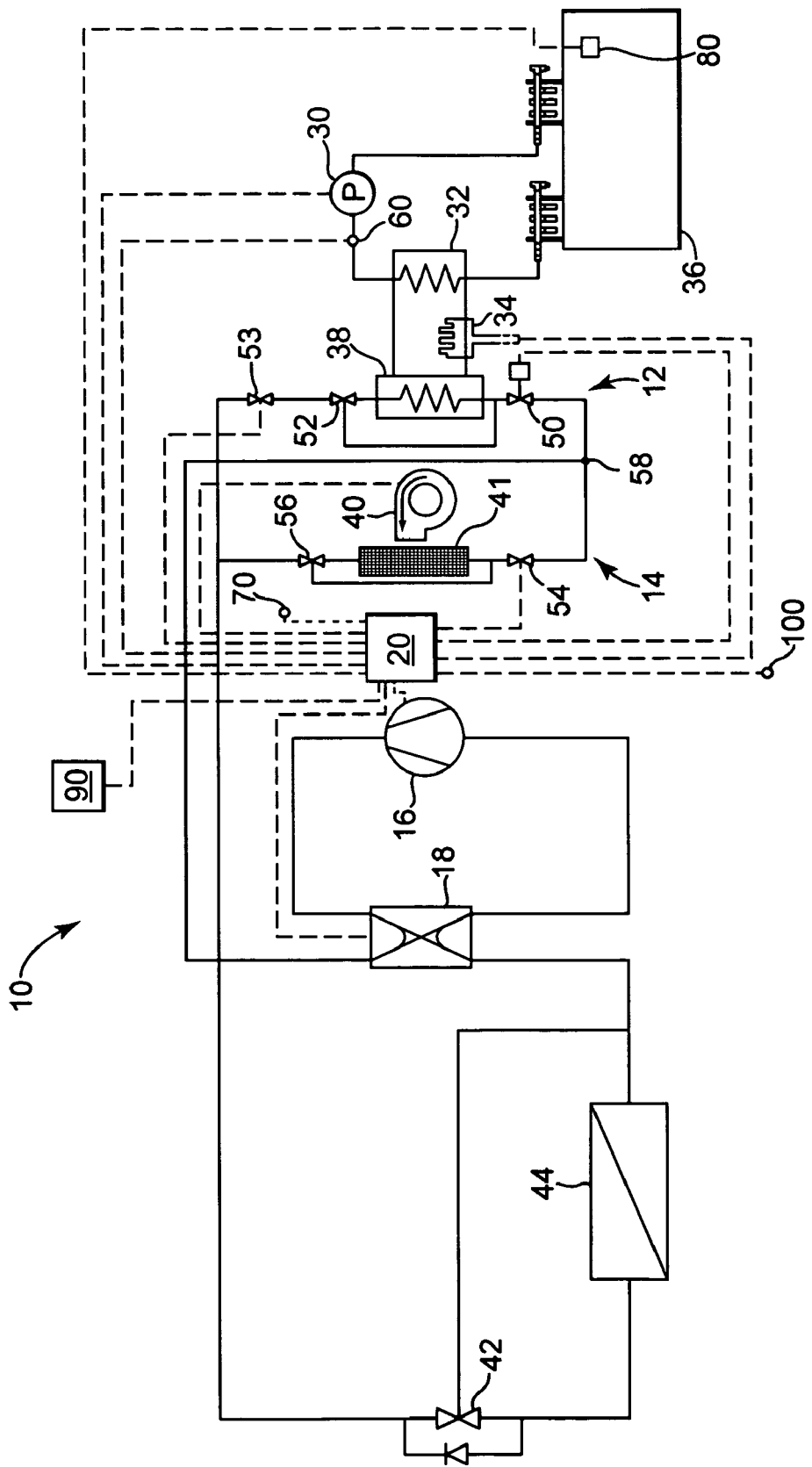
FIG. 2A illustrates a simplified schematic of a heating/cooling system according to one embodiment of the present invention.

FIG. 2A illustrates a simplified schematic of a heating/cooling system 10 according to one embodiment of the present invention. The heating/cooling system 10 includes a first heat exchange loop 12, a second heat exchange loop 14, at least one compressor 16, a reversing valve 18, and a controller 20. In one embodiment, first heat exchange loop 12 is a refrigerant to water heat exchange loop and includes a water pump 30, a vessel 32, auxiliary electrical heating elements 34, hydronic radiant loops 36, a condenser 38, and outdoor coil 44. In one embodiment, second heat exchange loop 14 is a refrigerant to air heat exchange loop and includes an blower 40 and a second condenser 41 coupled to outdoor coil 44. In other useful embodiments the at least one compressor 16 may advantageously be a multi-speed compressor, a variable speed compressor, dual compressors, at least two compressors controlled to function as a variable speed compressor or equivalents.

In one embodiment, first heat exchange loop 12 is coupled in parallel to second heat exchange loop 14. In this regard, controller 20 controls a flow path of refrigerant through a parallel system of valves in dividing and balancing heating/cooling output from first heat exchange loop 12 and second heat exchange loop 14 to meet a heating/cooling load of structure 6. For example, first heat exchange loop 12 includes valve 50 connected to condenser 38, and second heat exchange loop 14 includes valve 54 connected to second condenser 41. In one embodiment, a splitter 58 is provided that selectively splits a flow of refrigerant into one or both of valves 50, 54 depending upon a setting of controller 20. In this manner, controller 20 provides all of, or a portion of, refrigerant flow to one or both of valves 50, 54 in balancing heating/cooling output from first heat exchange loop 12 and second heat exchange loop 14, as more fully described below for specific heating/cooling conditions.

The compressor 16 is coupled to first heat exchange loop 12 and second heat exchange loop 14. In one embodiment, compressor 16 is a multi-speed compressor. In another embodiment, compressor 16 is a two-speed compressor, although it is to be understood that, alternately, two compressors operated at two different speeds is similarly effective. For example, in one embodiment, structure 6 is air-cooled and compressor 16 is operated at a first, low, speed. In another embodiment, structure 6 is heated by both first and second heat exchangers 12, 14 and compressor 16 is operated at a second, high, speed. With this in mind, controller 20 is configured to independently control each of first heat exchange loop 12 (via valve 50) and second heat exchange loop 14 (via valve 54) based upon at least one sensed indoor temperature to maintain a range of selected temperature set points within a structure to be heated or cooled, as described below.

The heating/cooling system 10 is adapted to provide both air heating/conditioning and radiant heating within a structure. To this end, in one embodiment, first heat exchange loop 12 is a refrigerant to water heat exchanger and is provided with a first temperature sensor 60 disposed within first heat exchange loop 12. In one embodiment, second heat exchange loop 14 is a refrigerant to air heat exchanger and is provided with a second temperature sensor 70 disposed within the second heat exchange loop 14. With this in mind, first temperature sensor 60 and second temperature sensor 70 provide temperature inputs to controller 20, thus enabling controller 20 to balance heating/cooling output from first heat exchange loop 12 and second heat exchange loop 14 based upon a sensed indoor temperature.

To effectuate efficient and complete heating/cooling within the structure, controller 20 is responsive to an indoor floor temperature input 80 in radiant loops 36, and an indoor room air temperature input 90 in blower 40. For example, in one embodiment controller 20 compares a temperature from first sensor 60 to floor temperature input 80, and controller 20 compares a temperature from second sensor 70 to room air temperature input 90 to select an appropriate speed of compressor 16 and an appropriate balancing of refrigerant across valves 50, 54 in balancing heating/cooling from first heat exchange loop 12 and second heat exchange loop 14. In this manner, controller 20 independently controls first heat exchange loop 12 and second heat exchange loop 14 by sensing a water temperature at sensor 60, an air temperature at sensor 70, a floor temperature via floor temperature input 80, and a room air temperature via air temperature input 90, and adjusts a proportion of refrigerant flow through one or both valves 50, 54. To this end, controller 20, in combination with the splitter 58 and valves 50, 54, directs heating/cooling flow as needed through hydronic radiant loops 36 and various ductwork components (not shown) connected to blower 40.

In one embodiment, first heat exchange loop 12 is a hydronic radiant floor heat exchange loop. In another embodiment, first heat exchange loop 12 is a hydronic radiant wall heat exchange loop. In any regard, first heat exchange loop 12 includes hydronic radiant loops 36 configured to warm-water heat a section of structure 6. In another embodiment, first heat exchange loop 12 includes a domestic hot tank used to selectively providing hot water heat for a household domestic water heat system.

Hydronic radiant loops 36 offer negligible cooling or air conditioning to the air spaces 8. However, it has been surprisingly discovered that a real time selective combination of radiant heating of floor 7 and the forced air heating/cooling of air spaces 8 results in rapid and efficient thermodynamic control of structures 6, and in particular, rapid and efficient thermodynamic control of structures 6 in northern climates. Specifically, the refrigerant to water heat exchange of hydronic radiant loops 36, combined with the refrigerant to air heat exchange of blower 40, offers a thermodynamically responsive system capable of efficiently heating a northern climate home in the winter, and effectively cooling the same northern climate home in the summer. The hydronic radiant loops 36 may advantageously be a heating load selected from the group consisting radiant floor tubing, radiant wall panels, radiators, a water coil, a radiant floor heating system and a radiant wall heating system, other types of piping or their equivalents.

With reference to FIGS. 1 and 2A, in one embodiment structure 6 is a northern climate structure and the heating/cooling system 10 is a heat pump wherein first heat exchange loop 12 and second heat exchange loop 14 are separately and independently controlled. In an exemplary embodiment, first heat exchange loop 12 is a refrigerant-to-water heat exchanger employed as a heat pump to heat structure 6, and a refrigerant-to-air heat exchanger is employed in second heat exchange loop 14 to thermodynamically control temperature in air spaces 8. Sensors 60, 70 supply independent thermostatic information to controller 20, and controller 20 selectively adjusts a speed of compressor 16.

Figure 2B:
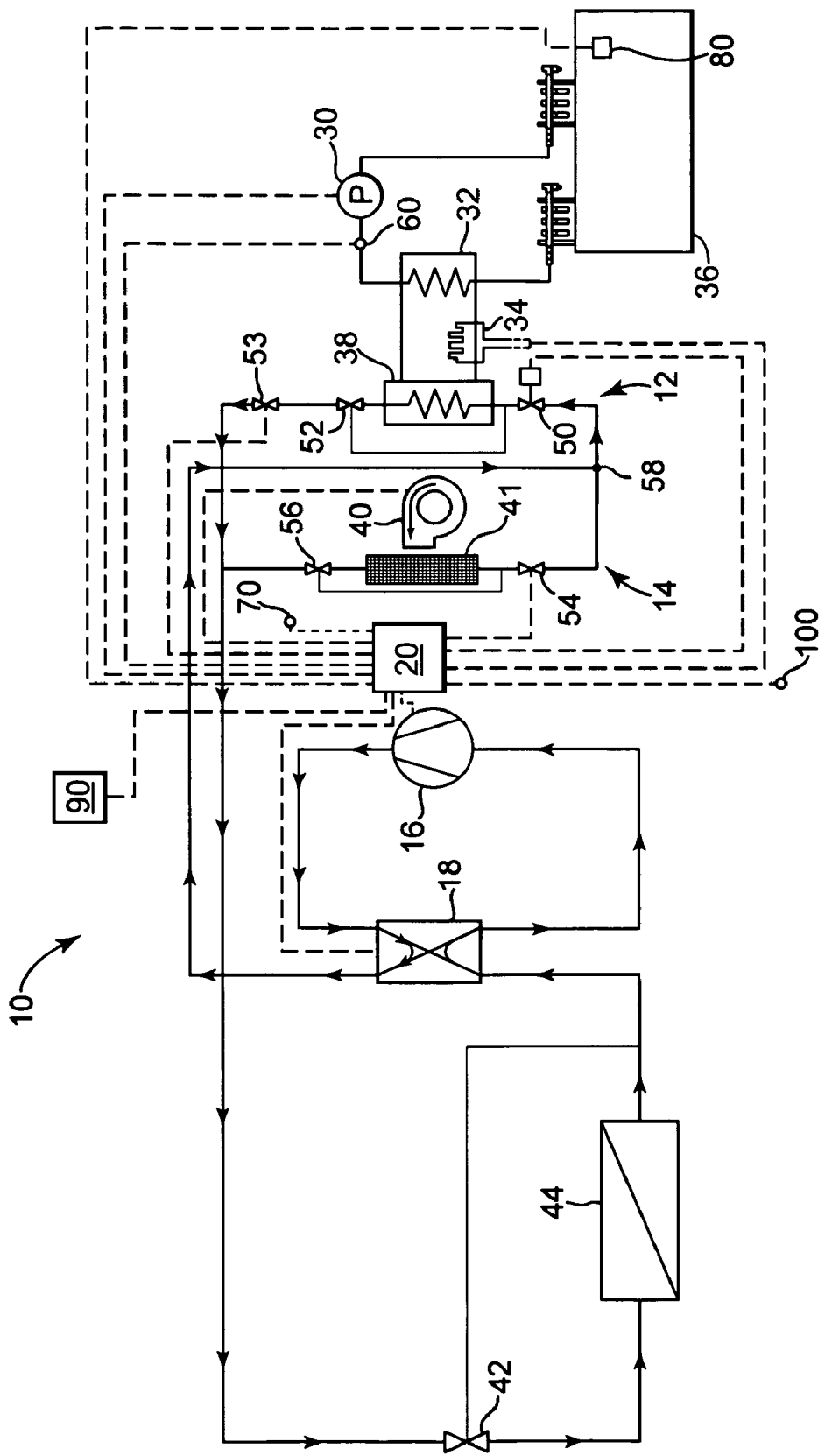
FIG. 2B illustrates a simplified schematic of a heating/cooling system in a water heating mode according to one embodiment of the present invention.

FIG. 2B illustrates heating/cooling system 10 in a water heating mode according to one embodiment of the present invention. Reference is made to the directional arrows indicated in FIG. 2B starting at compressor 16. With this in mind, refrigerant enters compressor 16 and is compressed, and enters a top side of reversing valve 18. Refrigerant exits the same top side of reversing valve 18 and flows toward splitter 58, where the refrigerant is directed into valve 50. Thereafter, the refrigerant flows to water coil (condenser) 38 where the refrigerant is condensed into a liquid refrigerant, and heat removed from the refrigerant is discharged into hydronic radiant loops 36. Thereafter, the refrigerant flows across the diagram illustrated in FIG. 2B and through valve 42, as indicated, prior to entering outdoor coil 44, here operating as an evaporator. Upon leaving the outdoor coil 44, the refrigerant enters a bottom portion of reversing valve 18, and exits adjacent the same bottom portion of reversing valve 18, before entering compressor 16 to repeat the cycle. With the above in mind, FIG. 2B illustrates heating/cooling system 10 operated as a heat pump to heat structure 6 (FIG. 1).

Figure 2C:
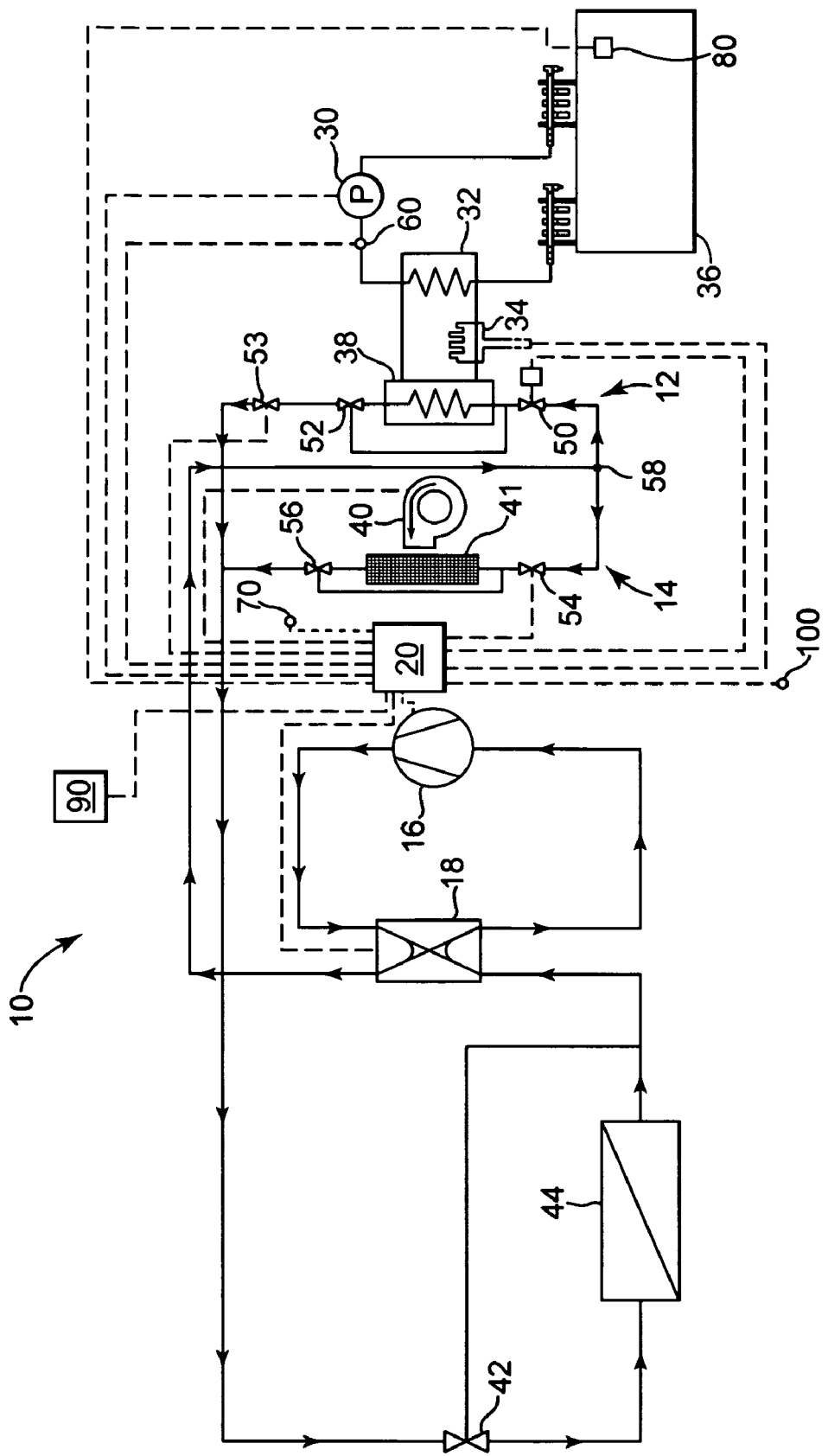
FIG. 2C illustrates a simplified schematic of a heating/cooling system in a dual air and water heating mode according to one embodiment of the present invention.

FIG. 2C illustrates heating/cooling system 10 operated in an air and water heating mode according to one embodiment of the present invention. Once again, reference is made to directional arrows in FIG. 2C starting at compressor 16. Refrigerant enters compressor 16 and is compressed and delivered to reversing valve 18. Refrigerant enters a top portion of reversing valve 18 and exits adjacent the same top portion of reversing valve 18 prior to being delivered to splitter 58. Splitter 58 is controlled by controller 20 to permit a portion of refrigerant to flow into first heat exchange loop 12, and a remaining portion of refrigerant to flow into second heat exchange loop 14. In this regard, heating/cooling system 10 is employed to both air and water heat, for example, structure 6 (FIG. 1). In one embodiment, a portion of the first refrigerant to water heat exchange loop 12 is bypassed, and the refrigerant mixes with and "heat boosts" the second refrigerant to air heat exchange loop 14 to more efficiently forced air heat at least one room of the structure 6. The portion of refrigerant entering first heat exchange loop 12 flows through valve 50, and through water coil 38 where the refrigerant is condensed into a liquid and heat is removed from the refrigerant and discharged into the hydronic radiant loops 36 (substantially as described above in FIG. 2B). In one aspect of the invention, a remaining portion of the refrigerant also flows into second heat exchange loop 14 after leaving splitter 58. The refrigerant in this case flows through valve 54 and through condenser 41, where blower 40 provides air heating to the heated area, for example, within structure 6. Thereafter, the refrigerant joins with the refrigerant discharged from water coil 38. The combined streams of refrigerant then flow into outdoor coil 44, as indicated by the directional arrows. In a manner similar to that described above with regard to FIG. 2B, the refrigerant exits outdoor coil 44, here operating as an evaporator, and flows into a bottom portion of reversing valve 18, and exits adjacent the same bottom portion of that reversing valve 18, prior to entering compressor 16 to repeat the dual heating cycle.

With reference to auxiliary electrical heating elements 34, auxiliary heating elements 34 are optional and may be used to provide additional water heating to the radiant loops 36. In one embodiment, auxiliary heating elements 34 are controlled/operated as a severe cold weather backup for heating/cooling system 10. In this regard auxiliary heating elements 34 are "peaking" back up heat provided to heating/cooling system 10 during severe cold weather in northern climates. Controller 20 can control heating elements 34 in a continuous manner to supplement the heating provided by radiant loops 36.

Figure 2D:
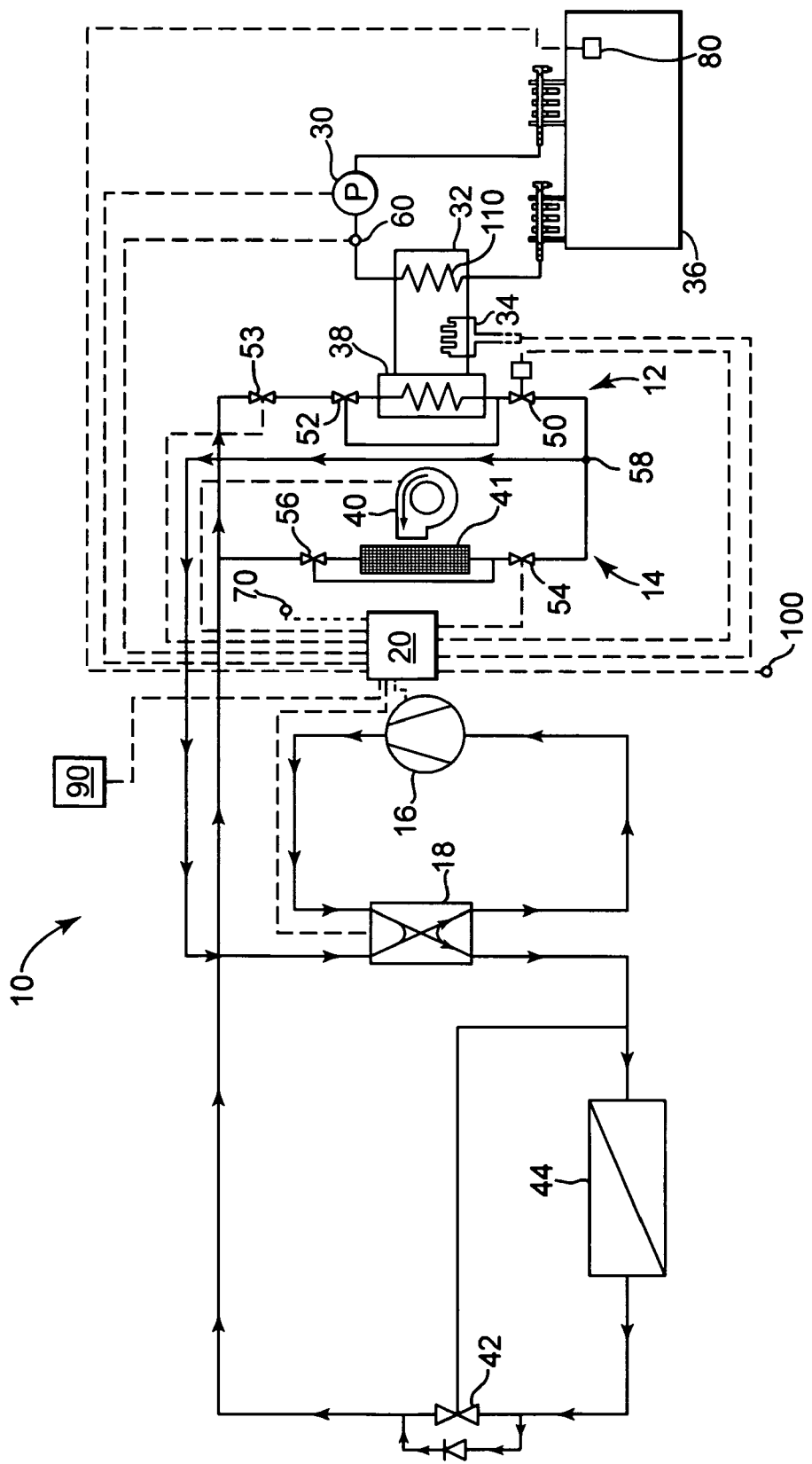
FIG. 2D illustrates a simplified schematic of a heating/cooling system in a defrost mode according to one embodiment of the present invention.

FIG. 2D illustrates a simplified schematic of heating/cooling system 10 operated in a defrost mode according to one embodiment of the present invention. With regard to a defrost cycle, during winter heating, for example, it is quite possible that outdoor coil 44 will operate at a temperature below freezing (i.e., below 32 degrees Fahrenheit). When outdoor ambient temperatures are below freezing, any moisture that is removed from the air will immediately freeze upon a surface of the coils. The frost on the coils will continue to build up and cause the outdoor coil 44 to restrict airflow. Moreover, a frost buildup upon the coils will act as an insulator, thereby reducing the heat transfer and further reducing efficiency of the coils. With this in mind, heating/cooling system 10 provides a defrost mode to remove buildup of frost on outdoor coils during the heating season. Controller 20 determines the beginning of the defrost cycle and controls reversing valve 18 to initiate defrost.

One aspect of a defrost mode of heating/cooling system 10 is described with reference to directional arrows as shown in FIG. 2D, beginning at compressor 16. Refrigerant flows through compressor 16, is compressed, and flows into a top portion of reversing valve 18. The refrigerant flows through reversing valve 18, exiting at a bottom portion (a bottom portion on the left hand side of reversing valve 18 as oriented in FIG. 2D), and enters into outdoor coil 44, which in the defrost mode is a condenser. Refrigerant flows through outdoor coil 44 and bypasses around expansion valve 42, entering expansion valve 52 and water coil 38 (an evaporator), converting the refrigerant to liquid. As the liquid refrigerant flows through water coil 38, it extracts heat from vessel 32, as valve 50 is open. In this regard, coil 110 and vessel 32 provide heat (extracted from hydronic radiant loops 36) that is employed within the cycle depicted in FIG. 2D to defrost outdoor coil 44. Thereafter, the refrigerant flows into splitter 58 (as valve 54 is closed), upward into a top of reversing valve 18, across and through reversing valve 18, exiting downward from reversing valve 18 and into compressor 16. In this regard the cycle can be repeated to provide heat extraction from hydronic radiant loops 36 to defrost outdoor coil 44. In contrast to other heating/cooling systems that inefficiently employ auxiliary heating to frosted coils, one aspect of heating/cooling system 10 described with reference to FIG. 2D includes defrosting a frosted outdoor coil without employing auxiliary heat.

Figure 2E:
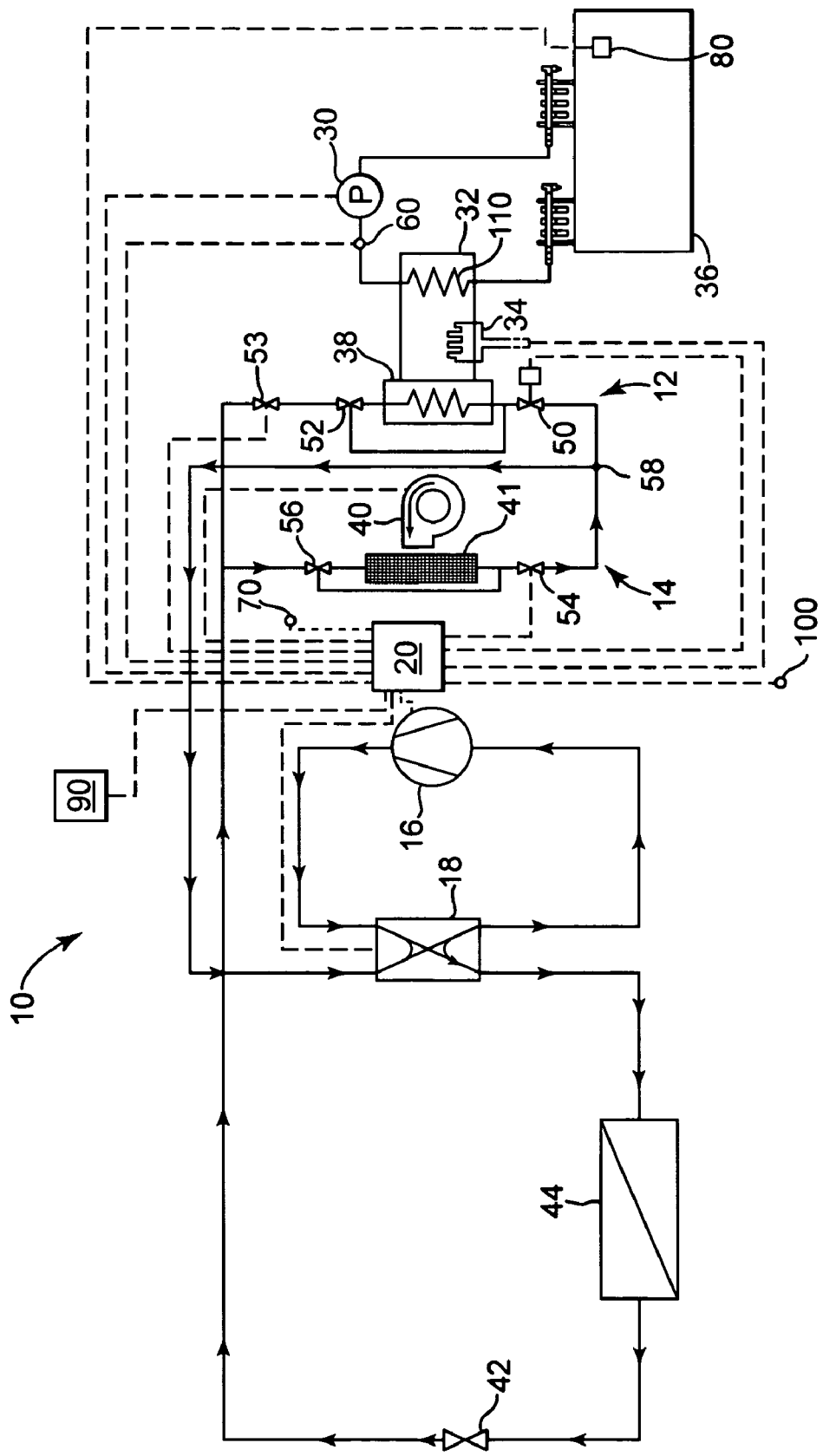
FIG. 2E illustrates a simplified schematic of a heating/cooling system in a cooling mode according to one embodiment of the present invention.

FIG. 2E illustrates a simplified schematic of heating/cooling system 10 employed in a cooling mode according to one embodiment of the present invention. Reference is made to directional arrows in FIG. 2E beginning at compressor 16. Refrigerant flows into compressor 16, and is compressed and directed into reversing valve 18. The refrigerant enters a top portion of reversing valve 18, flows through reversing valve 18, and exits a bottom left hand side of reversing valve 18 (as oriented in FIG. 2E) and flows into outdoor coil 44. The refrigerant exits outdoor coil 44, acting here as a condenser, now a liquid, and enters expansion valve 56. Valve 53 is closed preventing liquid from entering the water heat exchanger 38. In this regard, the cooling cycle only uses heat exchanger 41, as valve 54 is open. The refrigerant evaporates in heat exchanger 41 and absorbs heat, thus providing cooling for air spaces 8 (FIG. 1). Thereafter, the refrigerant flows through valve 54 and into splitter 58, where the refrigerant flows into a top portion of reversing valve 18. The refrigerant is directed to and through reversing valve 18, exiting a bottom right hand portion of reversing valve 18, prior to entering compressor 16 to repeat the cycle.

Figure 2F:
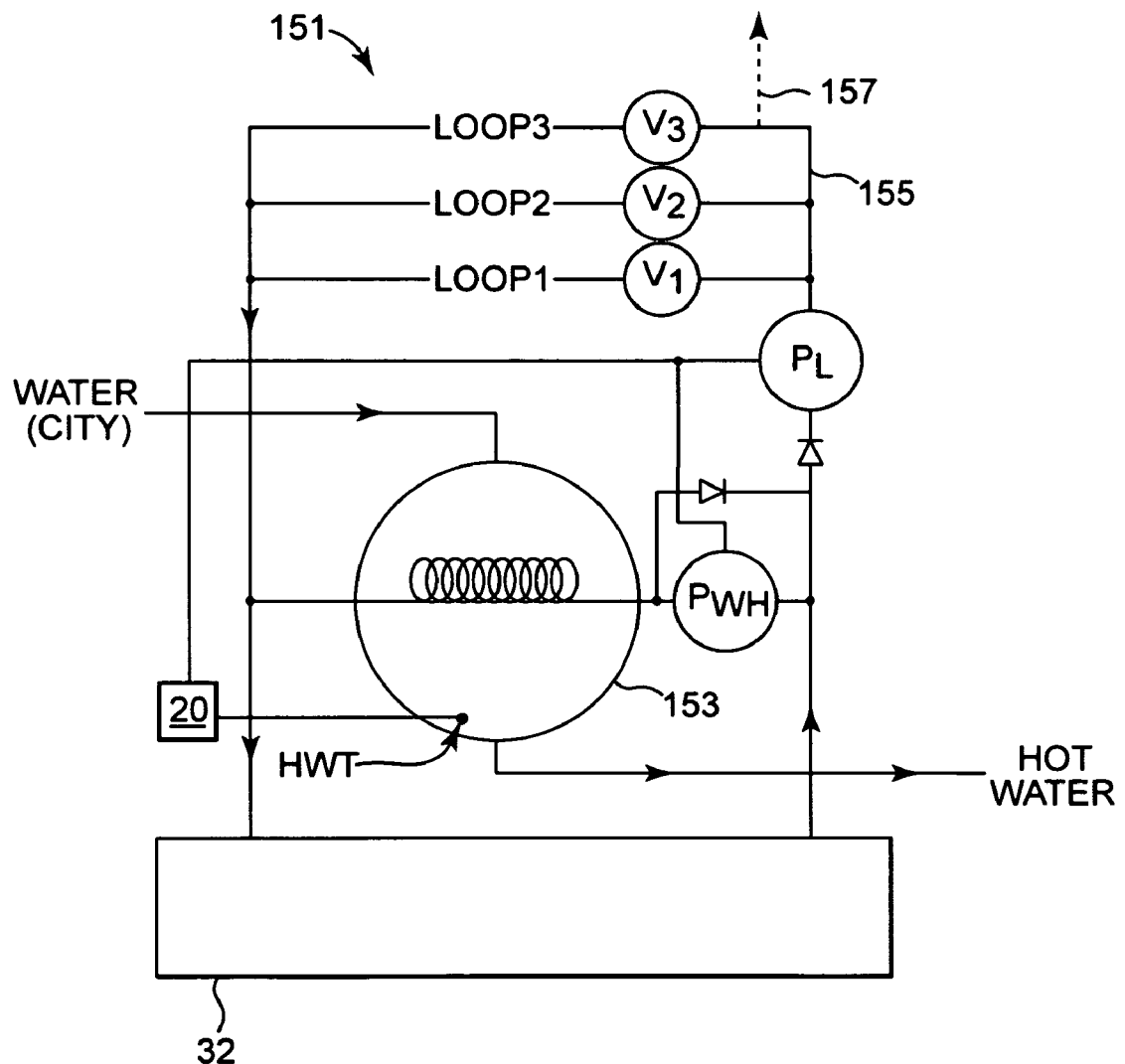
FIG. 2F illustrates a simplified schematic of a household domestic water heat system according to one embodiment of the present invention.

System 10 optionally provides a household domestic water heat system 151 as illustrated in FIG. 2F and according to one embodiment of the present invention. City water enters water tank 153. In one embodiment, water tank 153 is a 52-gallon water tank and includes a temperature sensor HWT. A first pump PWH is connected to water tank 153, and a second pump PL is piped downstream to a radiant heat loop system 155. Any useful number of loops may be employed in the radiant heat loop system 155. In one useful embodiment, a plurality of loops, for example, loop 1, loop 2, and loop 3 including respective valves V1, V2, and V3 is coupled to the coil in vessel 32 and operate cooperatively to heat the structure 6. In one embodiment, water heat system 151 operates at an efficiency of greater than approximately 200%. In this regard, heat energy from the water tank 153 is supplied to a small zone in the structure (for example a radiantly heated bathroom floor), without cycling compressor 16, as detailed in Table 1 below.

FIGS. 2B-2E describe various heating/cooling cycles for system 10. The heating/cooling is selectively controlled to affect various portions of structure 6. In this regard, in one embodiment controller 20 controls a switch (not illustrated) enabling heating/cooling from heat exchange loops 12, 14 to affect one or more priority zones. For example, when the controller 20 senses a temperature in sensor 70 below a predetermined set point, controller 20 selectively terminates heat exchange loop 12 in order to provide air heating, for example, to air spaces 8. In this regard, the thermodynamic response in radiant loops 36 is not immediate, such that priority heating/cooling, and in particular priority heating, delivered to blower 40 does not deleteriously impede heat exchange loop 12 from maintaining a temperature set point. It is to be understood that controller 20 can control heating/cooling of a plurality of zones in each of heat exchange loop 12 and heat exchange loop 14, as described below with reference to FIGS. 3A and 3B.

In one embodiment, controller 20 continuously monitors outdoor temperature 100. As outdoor air temperature 100 decreases, indicating more heat energy is required to maintain a desired temperature within structure 6, sensors 60, 70 signal controller 20, that in turn controls compressor 16 (and other components), to initiate an increase in the heating energy in one or both of first heat exchange loop 12 and second heat exchange loop 14.

Figure 2G:
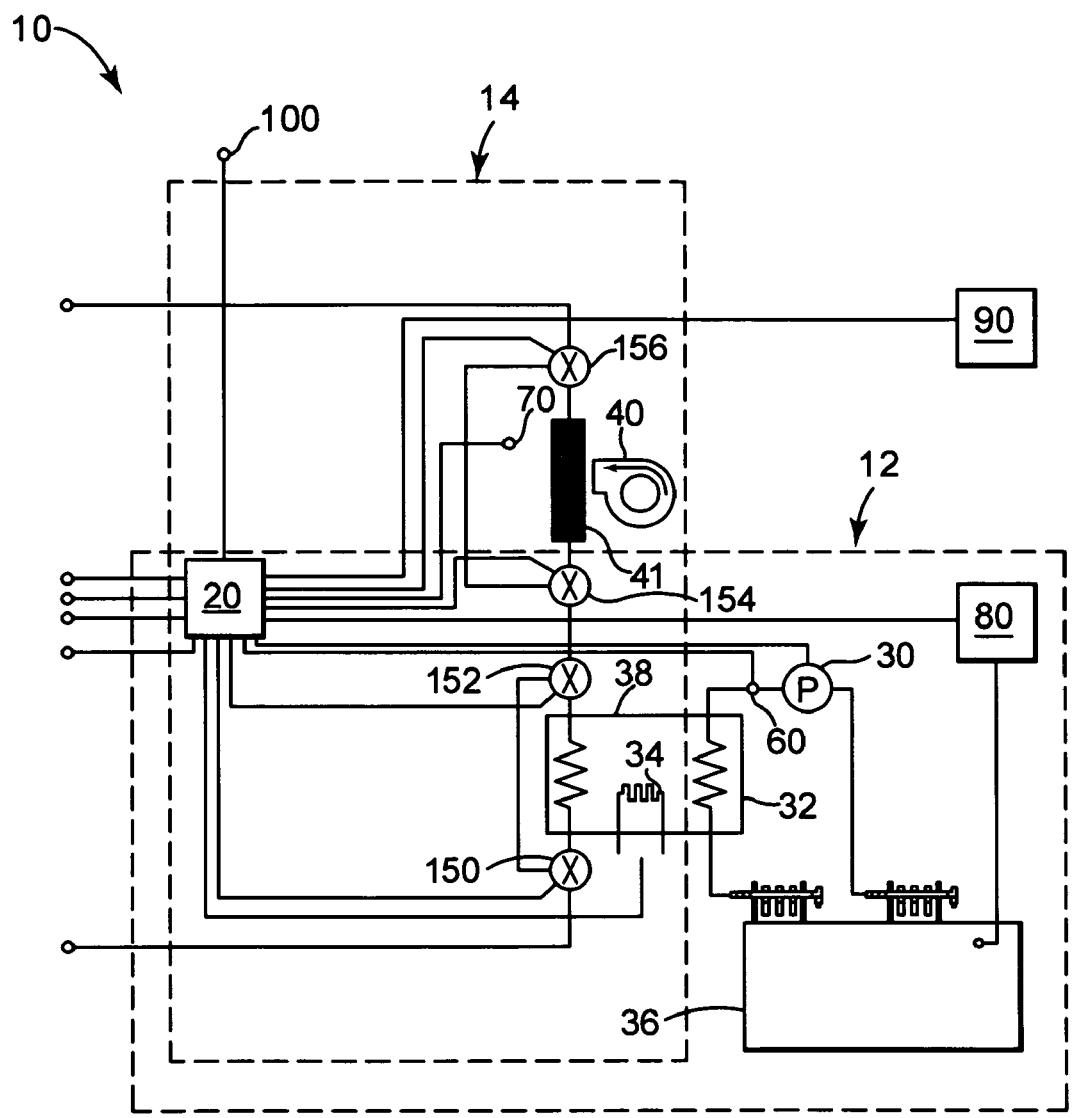
FIG. 2G illustrates a simplified schematic of an alternative embodiment of a heating/cooling system of the present invention.

Referring now to FIG. 2G, a simplified schematic of an alternative embodiment of a heating/cooling system of the present invention is there illustrated. In the alternative embodiment, heat exchanger 41 associated with the refrigerant to air heating/cooling loop, and water coil 38, in vessel 32, are arranged in a serial configuration where refrigerant flow is regulated by a plurality of valves 150, 152, 154 and 156. While the system operates substantially similarly to the other embodiments described herein, the alternative configuration allows substantially entirely bypassing the first refrigerant to water heat exchange loop or substantially entirely bypassing the first refrigerant to air heat exchange loop through operation of the plurality of valves 150, 152, 154 and 156. Thus, in this alternate embodiment the generally parallel arrangement using splitter 58 and its associated valves 50 and 54 is replaced by the generally serial configuration selectively using bypass lines 152a and 154a to direct the refrigerant flow.

Figure 3A:
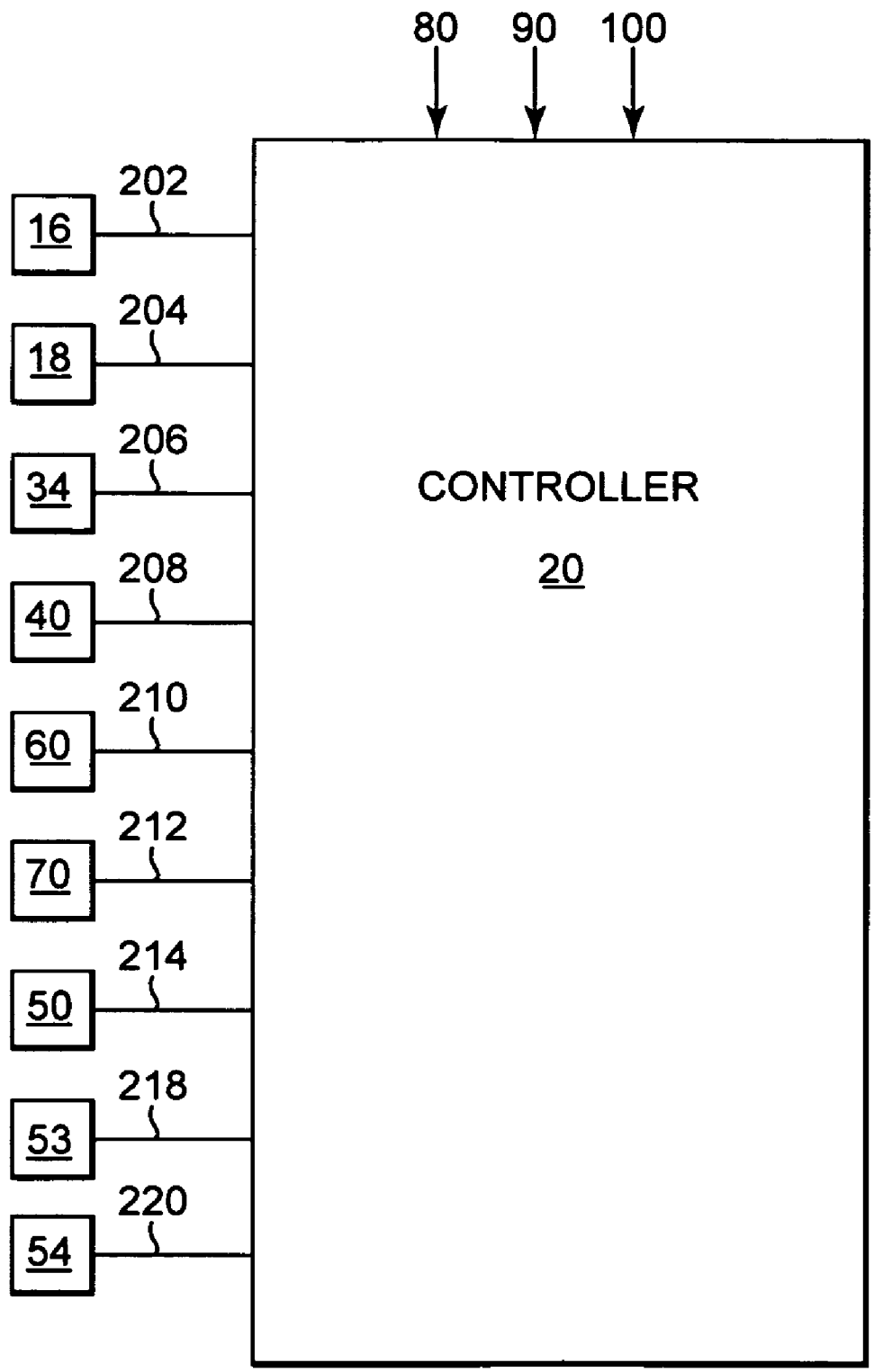
FIG. 3A illustrates a simplified schematic of a controller according to one embodiment of the present invention.

FIG. 3A illustrates a simplified schematic of controller 20 according to one embodiment of the present invention. With reference to FIG. 2A, controller 20 independently controls each of first heat exchange loop 12 and second heat exchange loop 14 based upon a variety of inputs, for example, floor temperature input 80, room air temperature input 90, and/or outdoor temperature 100. In particular, controller 20 monitors, controls, and responds to a variety of settings and set points including, but not limited to, a speed of compressor 16, a positioning of reversing valve 18, a setting of auxiliary heater 34, a setting of blower 40, water temperature at sensor 60, air temperature at sensor 70, and settings of valves 50 and 54. In one embodiment, controller 20 includes a central processing unit (CPU—not shown), memory (not shown), and programmable software (not shown) that controls heating/cooling system 10.

With the above in mind, a compressor communications path 202 communicates between compressor 16 and controller 20. A reversing valve communications path 204 communicates between reversing valve 18 and controller 20. An auxiliary heater communications path 206 communicates between auxiliary heater 34 and controller 20. An air systems communications path 208 communicates between blower 40 and controller 20. A first sensor communications path 210 communicates between first sensor 60 and controller 20. A second sensor communications path 212 communicates between second sensor 70 and controller 20. A first valve communications path 214 communicates between valve 50 and controller 20. A special shut off valve 53 communication path 218 communicates with controller 20. The air valve 54 communications path 220 communicates with controller 20.

In this regard, communications paths 202-220 are, in one embodiment, hard-wired communications paths. In another embodiment, communications paths 202-220 are wireless communication paths, such as radiofrequency (RF) communications paths. In a like manner, floor temperature input 80, room air temperature input 90, and outdoor air temperature 100 communicate with controller 20 and are, in one embodiment, thermostats. In one embodiment, floor temperature input 80, room air temperature input 90, and outdoor air temperature 100 communicate with controller 20 via hard-wired communications paths. In another embodiment, floor temperature input 80, room air temperature input 90, and outdoor temperature 100 communicate wirelessly with controller 20.

Figure 3B:
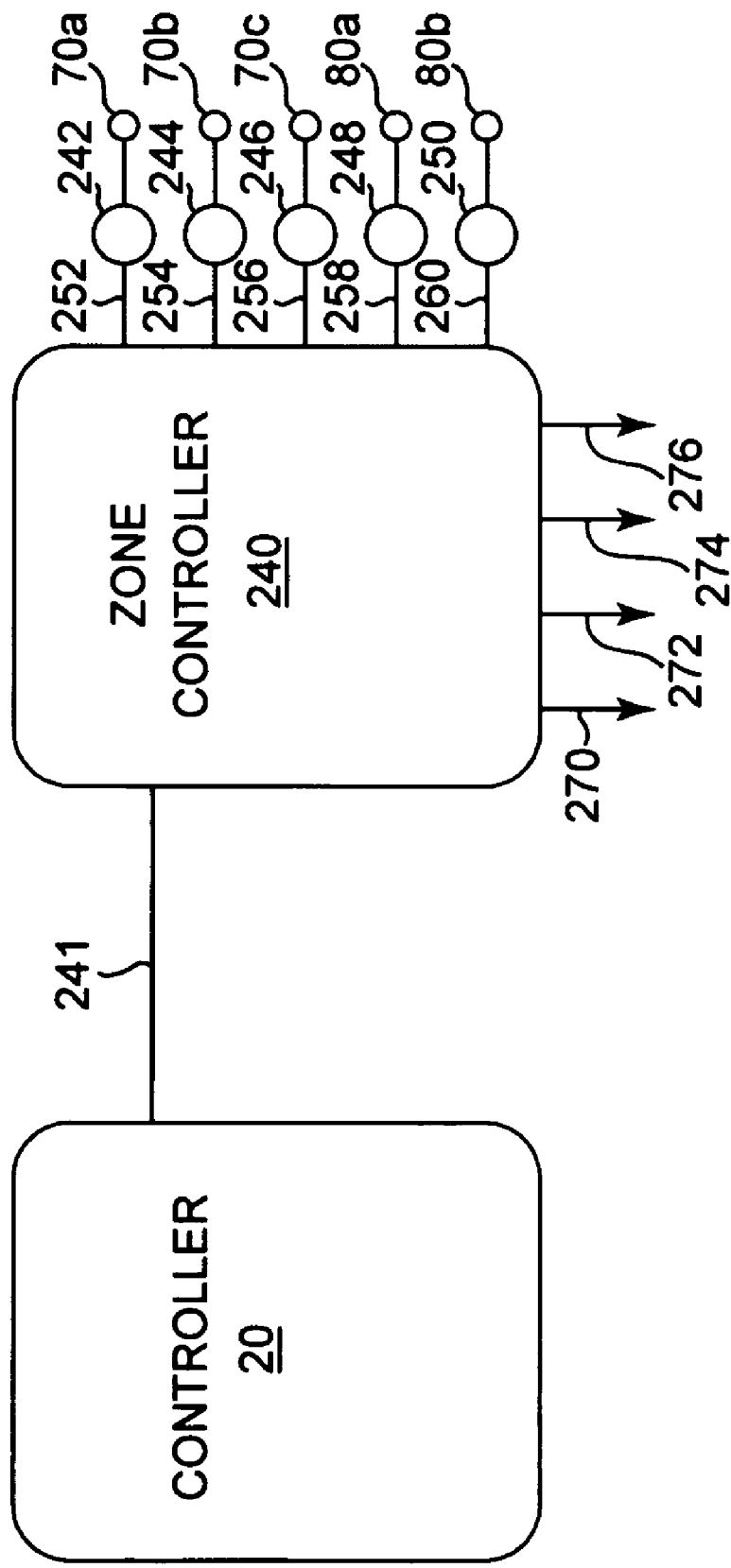
FIG. 3B illustrates a simplified schematic of a controller coupled to a zone controller according to one embodiment of the present invention.

FIG. 3B illustrates a simplified schematic of a controller 20 coupled via a communication line 241 to a zone controller 240 according to one embodiment of the present invention. In one aspect of the invention, each air space 8 (FIG. 1) can be assigned an individual temperature sensing thermostat, for example, thermostat 70a, 70b, 70c, where thermostats 80a, 80b are provided in a radiant loop section of floor 7. Each of the thermostats 70a, 70b, 70c, 80a, and 80b are electrically coupled to zone controller 240.

In one embodiment zone controller 240 includes a dial switch assigned to each zone. In this regard, dial switch 242 is coupled with zone thermostat 70a and to zone controller 240 via communications path 252, dial switch 244 is coupled with zone thermostat 70b and to zone controller 240 via communications path 254, dial switch 246 is coupled with zone thermostat 70c and to zone controller 240 via communications path 256, dial switch 248 is coupled with zone thermostat 80a and to zone controller 240 via communications path 258, and dial switch 250 is coupled with zone thermostat 80b and to zone controller 240 via communications path 260. In this manner, a heat load capacity for each zone 70a, 70b, 70c, 80a, and 80b can be monitored, and this information can be sent to controller 20, enabling controller 20 to select a speed setting of compressor 16 (and/or a setting of splitter 58) in adjusting (i.e., increasing or decreasing) and balancing heat output between first heat exchange loop 12 and second heat exchange loop 14.

Controller 20 is coupled to zone controller 240 via communication line 241. Zone controller 240 includes output lines 270, 272, 274, and 276 that can be coupled, in an exemplary and not limiting embodiment, to pump $P_L$, and the plurality of valves V1, V2 and V3, for example. Communication line 241 enables controller 20 and zone controller 240 to monitor and adjust to meet zonal heat load capacities as sensed by thermostats 70a, 70b, 70c, 80a, and 80b. In one embodiment, communication line 241 transmits real time load capacity as determined by zone controller 240 to controller 20.

In one embodiment, a total capacity for structure 6 is divided and managed by a variety of zones. For example, each of thermostats 70a, 70b, 70c, 80a, and 80b can represent a zone having a zone load heat capacity controlled by zone controller 240. In one embodiment, an installer adjusts each of dial switches 242-250 to correlate to a heating capacity (in BTU/hr) for each of the zones. When a zone becomes active (for example thermostat 70a turns on) zone controller 240 communicates a setting of dial switch 242 in real time to controller 20. Thus, controller 20 is signaled to query and selectively modify heat distribution through system 10. Based upon information derived from dial switches 242-250 (and thus based upon zone information in structure 6), controller 20 is enabled to control first and second heat exchange loops 12, 14 in balancing valve 50 and valve 54 to supply a heat output to meet zonal load capacity requirements. In one embodiment, zone controller 240 continually communicates in real time via communication line 241 to controller 20 a sum of zone capacities, thus enabling controller 20 to real time adjust a supply output of heating/cooling system 10.

With the above in mind, a small zone capacity can be advantageously controlled. For example, in one embodiment hydronic radiant loops 36 have a relatively small zonal capacity, for example 1000 BTU/hr, characteristic of hydronic heating of a bathroom. Zone controller 240 in communication with controller 20 enables heating/cooling system 10 to accommodate the relatively small (1000 BTU/hr) demand for heating in that particular zone.

With regard to the accommodation of a small zone capacity described above, controller 20 in communication with zone controller 240 collects information on a real time basis of a size of zone capacity for any zone in system 10. For example, for a zone capacity of less than 15,000 BTU/hr, in one embodiment controller 20 controls pump 30 (FIG. 2A) such that compressor 16 is not turned on, but rather energy from water tank 153 is employed to supply the 15,000 BTU/hr of heating to the appropriate zone. In this regard, controller 20 controls a water level and a water temperature in water tank 153 as heat from water tank 153 is employed to meet small zone heating capacity requirements.

In one embodiment, and with reference to FIGS. 2A, 2F and Table 1 below, controller 20 queries zone capacities on a real time basis, and for any zone capacity below 15,000 BTU/hr controller 20 controls, for example, pumps PWH and PL coupled to water tank 153 in such a way that compressor 16 is not turned "on," but rather the heat energy from a domestic hot water tank 153 is employed to supply energy to appropriate zones (as represented by a dotted line 157 in FIG. 2F). Hot water tank temperature sensor HWT is configured to send via signal a water temperature reading for water tank 153 to controller 20. If the water temperature drops to a predetermined level (i.e., when other users remove heat from the system, as, for example, while showering), controller 20 will enable compressor 16 and balance a heat output across valves V1, V2, and V3. In one embodiment, compressor 16 transitions to "full" output as energy is transported to replenish the domestic hot water supply and to small zones. However, the small zones are able to take in only so much energy as they can absorb, the remaining "excess" energy thus transporting into the domestic hot water supply.

TABLE 1

| Heat/Cool Mode | HWT (° F.) | Zones <15,000 BTU/hr | Zones >15,000 BTU/hr | PHW | PL | Compressor | Priority |
|---|---|---|---|---|---|---|---|
| H | >130 | — | — | — | — | Off | |
| H | <115 | — | — | On | Off | On | ✓ |
| H | >115 | ✓ | — | Off | On | Off | |
| H | <105 | ✓ | — | On | Off | On | ✓ |
| H | 130 | ✓ | — | Off | On | Off | |
| H | <115 | — | ✓ | On | Off | On | ✓ |
| H | >130 | — | — | Off | Off | Off | |
| ~3PM | Must be 130 | — | — | On | Off | On | ✓ |
| C | >115 | — | — | Off | Off | On | Normal air cooling |
| C | 110 | — | — | On | Off | On | Cooling off, flip to heating |
| C | 130 | — | — | Off | Off | On | Back to cooling |

In one embodiment, energy is diverted out of a particular zone (for example a small zone as described above) and/or other domestic hot water energy is consumed (for example when taking a shower), such that controller 20 senses an imbalance in heat output and heat zone capacity, thus turning on compressor 16 to increase a heat output to meet this change in total zonal heat capacity. In this regard, compressor 16 in one embodiment is operated at a second "high" speed at full output to replenish domestic hot water use and small zone heat capacity draw in household water heat system 151.

Figure 4:
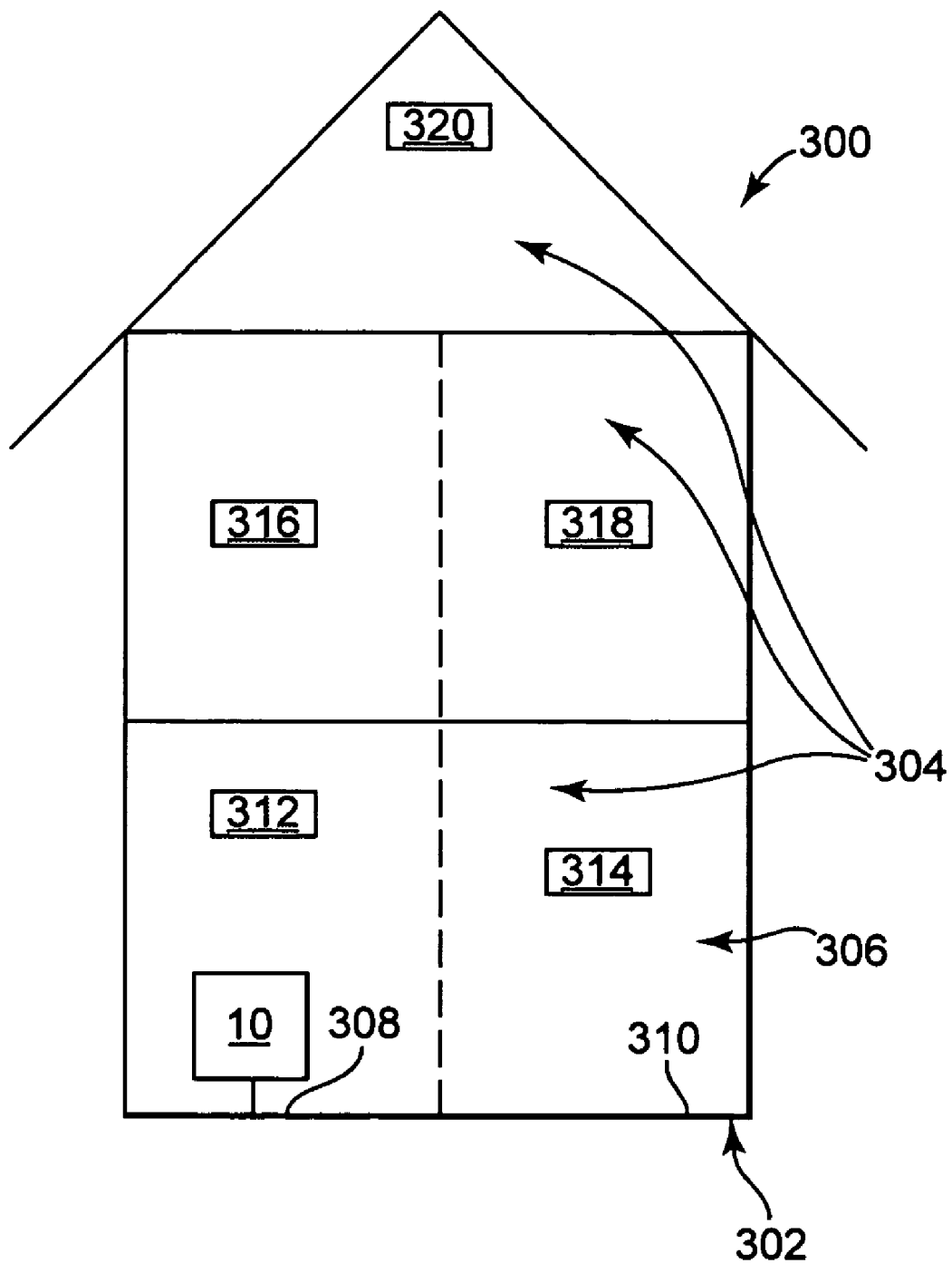
FIG. 4 illustrates a structure including a heating/cooling system and a plurality of heating/cooling zones according to one embodiment of the present invention.

FIG. 4 illustrates a thermodynamically controlled structure 300 including a plurality of heating/cooling zones according to one embodiment of the present invention. Structure 300 includes a floor 302, air spaces 304 including air spaces in a lower room area 306, and heating/cooling system 10 (as described above in FIG. 2) configured to heat/cool a plurality of independently controlled zones 308-320.

In one embodiment, controller 20 (FIGS. 3A and 3B) controls the plurality of heating/cooling zones 308-320. For example, in one embodiment, controller 20 thermostatically controls a first radiant floor zone 308 independently and separately from a second radiant floor zone 310, and controller 20 thermostatically controls air zones 312-320 independently and separately from each other zone in heating/cooling structure 300. In one embodiment, first radiant floor zone 308 is disposed in floor 7 adjacent, but for example in another room, separate from second radiant floor zone 310, and each of air zones 312-320 are disposed in separate rooms. It is to be understood that more than two radiant floor temperature zones and more than five room air temperature zones can be controlled by controller 20 and zone controller 240 based upon at least input information from first sensor 60 (FIG. 2) and second sensor 70 (FIG. 2). As a point of reference, the separate zones 308-320 need not be in separate rooms of structure 300. In controlling zones 308-320, controller 20 receives input from zone controller 240 and any of the inputs via any of the communication paths 202-220 (FIG. 3A). In addition, in one embodiment, any one or any set of zones 308-320 can be controlled as priority zones that receive immediate additional heating/cooling ahead of other non-selected zones.

A variety of refrigerants can be employed to implement embodiments of the present invention. Preferred refrigerants include the family of refrigerants, for example refrigerant R-410A, carbon dioxide and other equivalents. In one preferred embodiment, the refrigerant is carbon dioxide having an operable pressure-enthalpy range that spans the critical point of the carbon dioxide, as best illustrated in FIG. 5.

Figure 5:
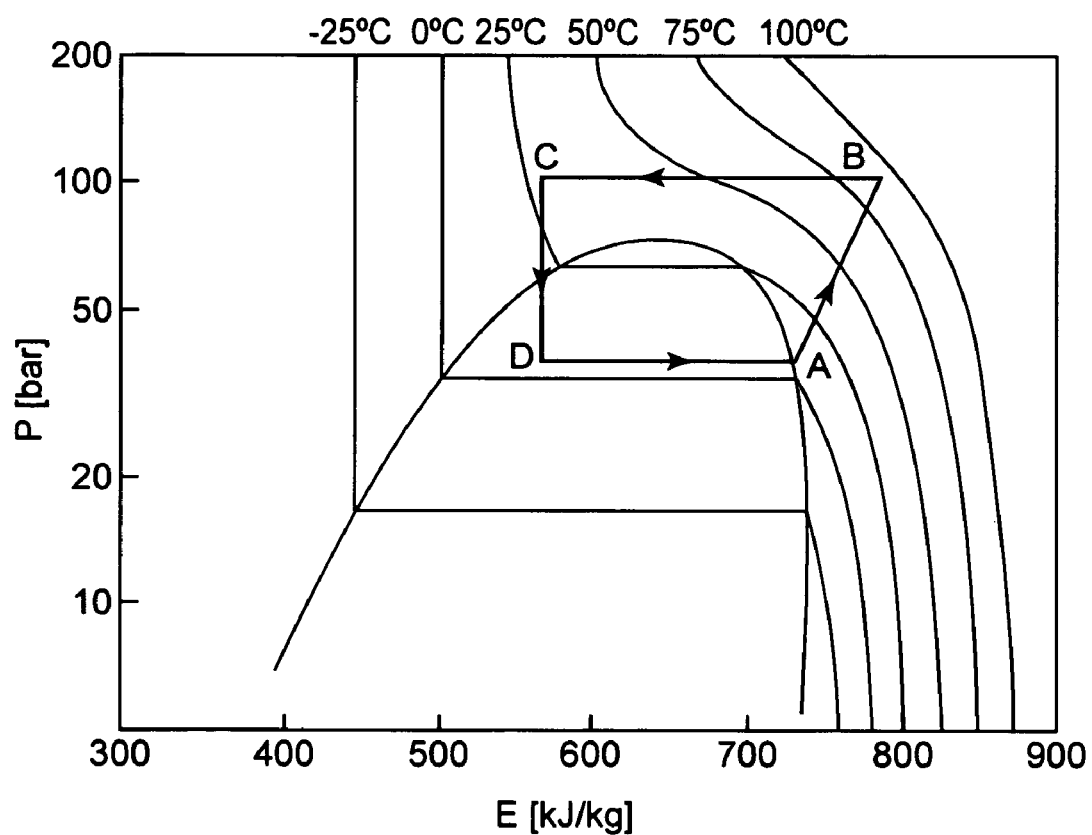
FIG. 5 is a simplified pressure-enthalpy curve of one refrigerant according to one embodiment of the present invention.

FIG. 5 illustrates a transcritical carbon dioxide pressure-enthalpy cycle beneficially employed in one embodiment of the present invention. In an exemplary embodiment, the critical point of carbon dioxide is 30.85 degrees Celsius and 73.53 bar and the carbon dioxide refrigerant utilized spans the critical point such that the evaporator temperature is below the critical temperature, and the high temperature use of the refrigerant is above the critical temperature. In such a refrigeration cycle, the carbon dioxide is said to be in a "transcritical cycle" where the evaporator operates as a vapor-liquid two-phase device, and the condenser operates as a super critical heat rejection device (i.e., a "gas cooler").

In one preferred embodiment, carbon dioxide is employed as the refrigerant and first heat exchange loop 12 is operated to produce a refrigerant to water heat exchange and second heat exchange loop 14 is operated to produce a refrigerant to air heat exchange. With this in mind, and with reference to FIG. 2A, first temperature sensor 60 and second temperature sensor 70 provide temperature inputs to controller 20, thus enabling controller 20 to independently control heating/cooling within first heat exchange loop 12 and second heat exchange loop 14 through the use of the carbon dioxide refrigerant.

The transcritical carbon dioxide cycle illustrated in FIG. 5 defines a pathway from point A to point B representing a compression process. In the compression process, the compressor (for example, compressor 16) increases the pressure of the carbon dioxide well above the critical pressure of 73.53 bar. The increase in pressure results in an increase in temperature, also above the critical temperature, as consistent with thermodynamic laws. The pathway from point B to point C defines a heat rejection process that follows a super critical isobar. That is to say, the pathway from point B to point C follows a line of constant pressure, the pressure being above the critical pressure, and the isobar being associated with a concomitant temperature loss for the refrigerant (carbon dioxide). The pathway from point C to point D defines an expansion process of a vapor cycle wherein the pressure is decreased along a line of constant enthalpy.

This heat rejection process along the super critical isobar is a feature that is substantially different than conventional vapor compression cycles. Specifically, the heat rejection from the carbon dioxide does not exhibit a constant temperature segment, but instead exhibits a continuously varying temperature associated with the thermodynamic properties of carbon dioxide in the transcritical region. In one embodiment, heat rejection along a super critical isobar is exploited by the heating/cooling system 10 as the temperature glide of the carbon dioxide refrigerant during the heat rejection process can provide a better match with the corresponding heat sink fluid than a constant temperature process employing condensation. In another embodiment, the heat rejection along the super critical isobar does not operate as a condenser, since no phase change occurs, and is therefore defined to be a gas cooler wherein the super critical carbon dioxide is permitted to continuously change density.

The cycle illustrated in FIG. 5 illustrates one example of transcritical refrigerant cycle technology. In one embodiment, the discharge pressure of the carbon dioxide refrigerant is approximately 90-100 bar. Consequently, for evaporation temperatures of approximately 0 degrees Celsius, the discharge temperature for a single stage compressor (for example, compressor 16) with dry saturated suction vapor is approximately 70-80 degrees Celsius. The discharge temperature is adjusted by varying the discharge pressure and suction vapor state by employing a suction-to-liquid line heat exchanger. In alternate embodiments, employing a multi-effect and/or a two-stage compression cycle as illustrated in FIG. 5 further optimizes the compression pathway from point A to point B. Decreasing the relatively high throttling losses for carbon dioxide can incrementally improve heat exchange output from the transcritical cycle illustrated in FIG. 5. In one embodiment, the expansion work illustrated in the transcritical carbon dioxide cycle is recovered directly by employing an expansion machine.

The compression process illustrated in FIG. 5 along the pathway from point A to point B results in a compression ratio that is greatly reduced compared to that of other refrigerants. To this end, the carbon dioxide employed as a refrigerant offers greater compressor efficiency, combined with an increased absolute pressure after compression. In one embodiment, the high-end pressure in a transcritical cycle employing carbon dioxide can be 140 bar. Since the volumetric heat capacity of carbon dioxide is five (5) to eight (8) times greater than other refrigerants, the mass flow rate is proportionately smaller for the same capacity, such that the diameter (i.e., size) of hydronic radiant loops 36 can be decreased.

The transcritical carbon dioxide cycle illustrated in FIG. 5 is useful in heating water, for example in a vessel loop. Generally, the temperature glide of the carbon dioxide refrigerant during super critical heat rejection results in a very good temperature adaptation. The temperature glide of carbon dioxide, combined with the efficient compression and good heat transfer characteristics of carbon dioxide, enables a very efficient heating/cooling system 10 design. As an example, in laboratory settings, the heating coefficient of performance (COP) is 4.3 when heating tap water from 9 degrees Celsius to 60 degrees Celsius at an evaporation temperature of 0 degrees Celsius. In addition, energy consumption of the transcritical carbon dioxide process in heating tap water is reduced by up to 75% compared to electrical water heating. Moreover, the carbon dioxide refrigerant employed in heating/cooling system 10 produces hot water with temperatures up to 90° C. This is of particular utility since the heating demands in many building structures stems from water heating, and this demand is increasing, such that transcritical carbon dioxide water heating is a solution with broad application.

Specific embodiments of heat pumps useful in heating/cooling systems have been illustrated and described above. It will be appreciated by those of ordinary skill in the art that a variety of alternate and/or equivalent implementations could be substituted for the specific embodiments illustrated and described without departing from the scope of the present invention.

What is claimed is:

1. A heat pump system comprising:
   a compressible refrigerant circulating through a first heating/cooling exchange loop including a refrigerant to water heat exchanger to produce a first output;
   the refrigerant circulating through a second heating/cooling exchange loop including a refrigerant to forced air heat exchanger to produce a second output;

the refrigerant flowing through at least one compressor fluidly coupled to the first heating/cooling exchange loop and the second heating/cooling exchange loop;

a controller
connecting to a plurality of inputs and controlling the speed of the compressor responsive to the plurality of inputs,
receiving data from a zone controller, the zone controller including a plurality of zoned thermostat inputs from within a building structure,
connected to control the first output and the second output and to transmit control signals to the at least one compressor, for balancing the first output and the second output responsive to a structural heating/cooling load,
diverting a portion of the refrigerant from the air heat exchanger to increase the first output;
both the refrigerant to water heat exchanger and the refrigerant to forced air heat exchanger are located within the structure; and
wherein the temperature and pressure of the refrigerant exiting the water heat exchanger is substantially equal to the temperature and pressure of the refrigerant entering the forced air heat exchanger.

2. The heat pump system of claim 1, further comprising a water pump and a vessel coupled to the first heating/cooling exchange loop.

3. The heat pump system of claim 2, wherein the vessel comprises auxiliary heating elements.

4. The heat pump system of claim 2, wherein
the second heating/cooling exchange loop includes a forced air conditioning system;
the refrigerant substantially bypasses the refrigerant to water heat exchanger; and
an auxiliary heating element heats the vessel.

5. The heat pump system of claim 1, further comprising a heating load on the first heating/cooling exchange loop, the heating load selected from the group consisting of radiant floor tubing, radiant wall panels, radiators, a water coil, a radiant floor heating system and a radiant wall heating system.

6. The heat pump system of claim 1, wherein
the controller is also electrically coupled to at least one floor temperature sensor;
the refrigerant flows through at least one outdoor heat exchanger fluidly coupled to both the first heating/cooling exchange loop and the second heating/cooling exchange loop; and
the pressure and temperature of the refrigerant entering the outdoor heat exchanger are substantially different than the pressure and temperature of the refrigerant entering the forced air heat exchanger.

7. The heat pump system of claim 6, wherein the floor temperature sensor comprises a thermostat.

8. The heat pump system of claim 1, wherein
the second heating/cooling exchange loop includes an indoor forced air heating system; and
the first heating/cooling exchange loop is coupled to a domestic water heating system.

9. The heat pump system of claim 1, wherein
at least one compressor is fluidly coupled in a loop to a reversing valve, the loop coupled to the first heating/cooling exchange loop and the second heating/cooling exchange loop; and
heat is removed from refrigerant in the water heat exchanger while heat is removed from refrigerant in the forced air heat exchanger.

10. The heat pump system of claim 1, wherein the at least one compressor is selected from the group consisting of a variable displacement compressor, dual compressors and at least two compressors controlled to function as a variable speed compressor.

11. The heat pump system of claim 1, wherein
the controller is coupled to a first temperature sensor and a second temperature sensor; and the first and second outputs are both heating outputs.

12. The heat pump system of claim 1, wherein the controller controls a first valve coupled to the first heat exchange loop and a second valve coupled to the second heat exchange loop, the first valve and the second valve configured to selectively proportion a flow of refrigerant through the first heating/cooling exchange loop and the second heating/cooling exchange loop.

13. The heat pump system of claim 12, wherein the first valve and the second valve regulate the flow of the refrigerant.

14. The heat pump system of claim 1 wherein
the plurality of inputs comprises at least two temperature inputs; and
the controller diverts substantially all of the refrigerant from the air heat exchanger to increase the first output.

15. The heat pump system of claim 1 wherein the control signals comprise signals for controlling the compressor, the signals selected from the group consisting of at least two balancing valves outputs, a compressor control output, a blower control output, and an electric element control output.

16. The heat pump system of claim 1, wherein the zone controller is configured to determine a load capacity from each of the plurality of zoned thermostat inputs and communicates the load capacity to the controller to select an output of the at least one compressor.

17. The heat pump system of claim 1, wherein the zone controller is configured to determine a load capacity from each of the plurality of zoned thermostat inputs and communicates the load capacity to the controller to transmit control outputs to the balancing valves for meeting a total heating/cooling load.

18. The heat pump system of claim 17, wherein the controller is configured to receive input and transmit output over a wireless communications path.

19. The heat pump system of claim 1, further comprising: an outdoor coil coupled to the first heating/cooling exchange loop wherein the outdoor coil is defrosted by transporting heat from the first heat exchange loop.

20. The heat pump system of claim 19, wherein transporting heat from the first heat exchange loop comprises diverting heated water energy from radiant loops in a radiant heated floor to the outdoor coil.

21. The heat pump system of claim 1, further comprising a small zone plumbing system including: at least one pump; at least one flow loop connected to the at least one pump; and a vessel plumbed between the at least one pump and a water supply, wherein heat energy from the household domestic plumbing system is supplied to a small zone, wherein the controller is electronically coupled to control the at least one flow loop.

22. A method for controlling the system of claim 1 in reaction to a plurality of heating/cooling zones, the method comprising the steps of: assigning each of a plurality of zones to one of a plurality of temperature sensors; transmitting zone information from each of the plurality of temperature sensors to the controller; monitoring a heat load capacity for each of the plurality of zones; and controlling the compressor to adjust and balance heat output between the first heating/ cooling exchange loop and the second heating/cooling exchange loop responsively to the heat load capacity.

23. The method of claim 22 wherein at least one dial switch is assigned to at least one of the plurality of zones.

24. The method of claim 22 wherein the plurality of temperature sensors comprise thermostats.

25. The method of claim 22 further comprising the step of correlating the at least one dial switch to a heating capacity for each zone.

26. The method of claim 22 wherein for a small zone heating capacity, the controller employs energy from hot water held in a water tank to supply the heating to the needy zone.

27. The method of claim 26 wherein a small zone heating capacity comprises a value corresponding to less than or equal to 50% of the lowest compressor output.

28. The method of claim 22 wherein a vessel temperature sensor is configured to send a water temperature reading for a water tank to the controller, where, if the water temperature drops to a predetermined level, the controller will enable the compressor and balance a heat output across a plurality of valves.

29. The method of claim 22 wherein, when the controller senses an imbalance in heat output and heat zone capacity, it responds by turning on the compressor to increase a heat output to meet a resultant change in total zonal heat capacity.

30. The method of claim 22 wherein the plurality of zones includes priority zones that receive immediate additional heating/cooling ahead of other non-selected zones.

31. The heat pump system of claim 1 wherein a first coil associated with the refrigerant to air heating/cooling loop, a second coil, an expansion valve, and the compressor are arranged in a serial configuration where refrigerant flow is regulated by a plurality of valves to allow selectively bypassing at least one of the first refrigerant to water heat exchange loop and the first refrigerant to air heat exchange loop.

32. The heat pump system of claim 1 wherein at least one zoned thermostat input is within a hydronics radiant loop within the structure.

33. The heat pump system of claim 1 wherein at least one zoned thermostat input is within a radiant floor zone of the structure.

34. The heat pump system of claim 1 wherein the zone thermostat input is within a radiantly heated bathroom floor of the structure.

35. The heat pump system of claim 1 wherein the zone controller controls a valve in a hydronics radiant loop within the structure.

36. The heat pump system of claim 35 wherein at least one zoned thermostat input is within the hydronics radiant loop within the structure.

37. The heat pump system of claim 35 wherein at least one zoned thermostat input is within a radiant floor zone of the structure.

38. The heat pump system of claim 35 wherein the zone thermostat input measures a water temperature within a radiantly heated bathroom floor of the structure.

39. The heat pump system of claim 1 wherein a first one zoned thermostat input measures an indoor room air temperature within the structure.

40. The heat pump system of claim 1 wherein at least one zone thermostat input measures the temperature of a room.

41. The heat pump system of claim 40 wherein the water heat exchanger warms a domestic hot water tank.

* * * * *